(12) United States Patent
Wu et al.

(10) Patent No.: US 6,405,857 B1
(45) Date of Patent: Jun. 18, 2002

(54) TRANSPORTATION MECHANISM OF MAGNETIC HANDLING FOR ACCESSING COMPACT DISKS

(75) Inventors: Jyh-Ming Wu; Yu-Pan Pai; Huan Chang Lin, all of Hsin Chu (TW)

(73) Assignee: Ritek Corporation, Taiwan (TW)

( * ) Notice: Subject to any disclaimer, the term of this patent is extended or adjusted under 35 U.S.C. 154(b) by 0 days.

(21) Appl. No.: 09/690,764

(22) Filed: Oct. 18, 2000

(51) Int. Cl.⁷ ............................................... B65G 15/58
(52) U.S. Cl. ............... 199/750.13; 414/416; 414/751.1; 414/793.2; 414/797.1
(58) Field of Search ......................... 198/468.5, 750.13; 414/416, 751.1, 793.2, 796.7, 797.1

(56) References Cited

U.S. PATENT DOCUMENTS

| | | | | |
|---|---|---|---|---|
| 4,465,415 A | * | 8/1984 | Eberling et al. | 414/797.1 |
| 4,597,490 A | * | 7/1986 | Seligman et al. | 198/468.5 |
| 5,306,111 A | * | 4/1994 | Higashiura | 414/797.1 |
| 5,549,444 A | * | 8/1996 | Dubuit | 414/796.7 |
| 5,692,878 A | * | 12/1997 | Freund | 414/796.7 |

* cited by examiner

Primary Examiner—Joseph E. Valenza
(74) Attorney, Agent, or Firm—Birch, Stewart, Kolasch & Birch, LLC

(57) ABSTRACT

A transportation mechanism of magnetic handling for accessing Compact Disks. The transportation mechanism includes a reciprocating device having a base, an electromagnetic head provided on the base, a control unit controlling the reciprocating device such that the base is reciprocated between different processing positions, and a magnetic spacer. The Compact Disk, sandwiched by the electromagnetic head and the magnetic spacer as the magnetic spacer is attracted by the electromagnetic head, is further transported by the transportation mechanism whereby the damage due to bad suction for CDs is minimized. Comparing with the conventional suction means by vacuum, the transportation mechanism of the invention is also advantaged for the simple structure, easy maintenance, and low cost, thereby raising the production yield.

7 Claims, 4 Drawing Sheets

# TRANSPORTATION MECHANISM OF MAGNETIC HANDLING FOR ACCESSING COMPACT DISKS

BACKGROUND OF THE INVENTION

A. Field of the Invention

The present invention relates to a transportation mechanism of magnetic handling for accessing Compact Disks, in particular, to a transportation mechanism with an electromagnetic attraction means used in the manufacturing of Compact Disks.

B. Description of the Related Art

In the manufacturing of Compact Disks like CD-ROM, DVD, and so on, a transportation mechanism is needed for conveying Compact Disks (hereafter referred to as CD) from one process to another. FIG. 1A is a schematic view of a conventional transportation mechanism provided with three suction heads by a vacuum for CDs and FIG. 1B is an enlarged front view of the suction head.

As shown in FIGS. 1A and 1B, a conventional transportation mechanism 100 of CDs includes a transporting arm 101, and a base 102 mounted at the transporting arm 101 and having a plurality of vacuum suction heads 103 for CDs. A typical suction head for a conventional vacuum chuck has vacuum ducts (not shown) connected together in the form of perforations or grooved channels including perforations. The cross-sectional area of suction determined by the overall perforations is somehow limited that the holding force exerted on the workpiece is hardly sufficient. As shown in FIG. 1A for the operation of the conventional suction head 103 by a vacuum, a vacuum pump (not shown) is powered on when the suction heads 103 are moved by the transporting arm 101 toward a feed portion of the non-information zone of the CD 104, then the suction heads 103 is caused to attract the CD 104 by the pressure difference between inside and outside of the vacuum ducts, and the CD 104 is further moved by the transporting arm 101 to a position for a manufacturing process and is further released by breaking up the vacuum of the vacuum ducts.

In general, the vacuum suction head is used for conveying the small-sized component of different processes, such as the electronic component being placed onto a printed circuit board. As for the manufacturing of CDs, the cross-sectional area of the vacuum suction head should be as large as possible to obtain the maximum sucking area in the non-information zone of the CD. However, compared to the normal-sized CD (120 mm), the mini-sized CD (32 mm) has a much smaller non-information zone such that the information zone surrounding the central opening of the CD is much easier to be unintentionally scratched by the suction head because of the limited sucking area of the suction head. Moreover, the attraction force provided by the conventional suction head of vacuum ducts is barely sufficient for a CD which is much heavier than the usual workpiece like the electronic component such that the CD chucked by a vacuum suction is much easier to be dropped accidentally during the transporting of manufacturing processes, thereby reducing the production yield. Besides, CDs are dropped more frequently during transportation because of the particle contamination due to the insufficient vacuum in ducts since such costly and complicated design is easy to be damaged in operation and difficult for maintenance.

SUMMARY OF THE INVENTION

One of the objects of the invention is to provide a transportation mechanism of magnetic handling by means of electromagnetic attraction for accessing CDs; the transportation mechanism includes a reciprocating device having a base, an electromagnetic head provided on the base, a control unit controlling the movement of the reciprocating device, and a magnetic spacer. The CD, sandwiched by the electromagnetic suction head and the magnetic spacer as the magnetic spacer is attracted by the electromagnetic head, is further transported by the transportation mechanism whereby the damage due to bad suction for CDs is minimized. In comparison with the conventional suction means by vacuum, the transportation mechanism of the invention is also advantaged for the simple structure, easy maintenance, and low cost, thereby raising the manufacturing yield.

BRIEF DESCRIPTION OF THE DRAWINGS

These and other objects and advantages of the present invention will become apparent with reference to the following description and accompanying drawings wherein.

DETAIL DESCRIPTION OF THE INVENTION

Figure 1A:
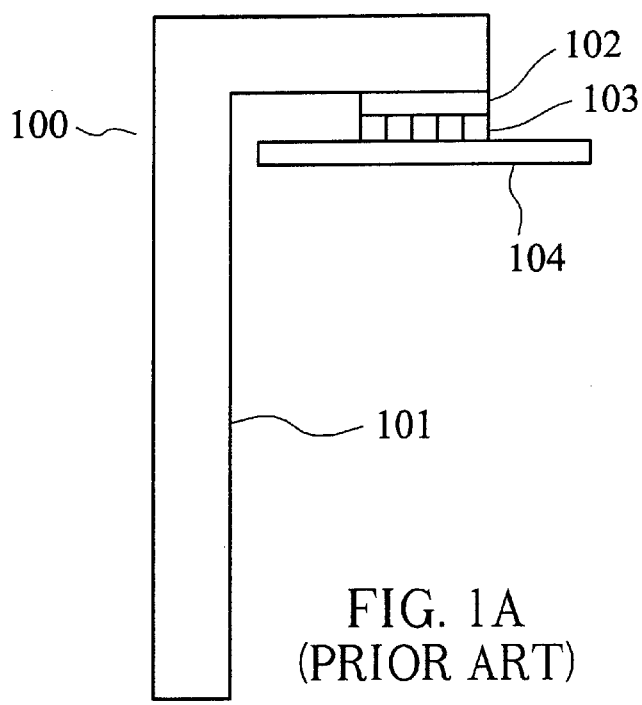
FIG. 1A is a schematic view of conventional transportation mechanism for CD with suction heads by vacuum implementation.
Figure 1B:
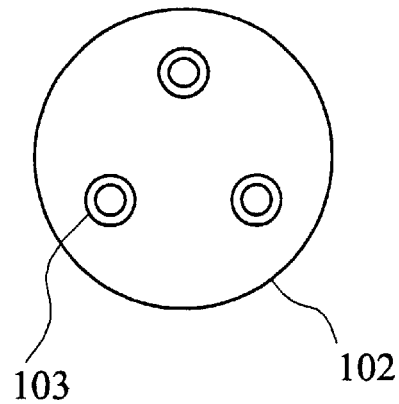
FIG. 1B is an enlarged front view of the suction head shown in FIG. 1A.
Figure 2A:
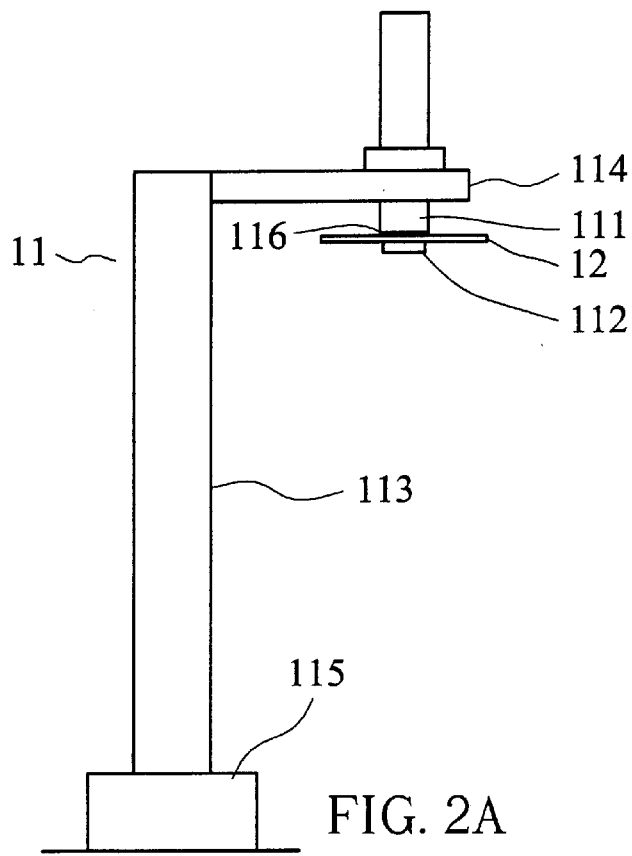
FIG. 2A is a schematic view of a transportation mechanism according to the first embodiment of the invention.
Figure 2B:
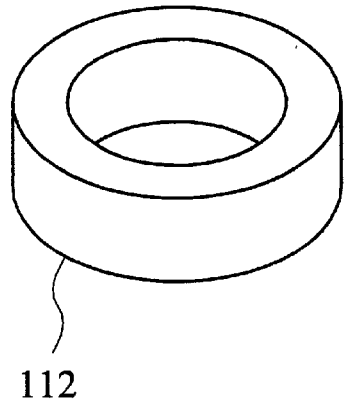
FIG. 2B is a pictorial view of the magnetic spacers shown in FIG. 2A.
Figure 2C:
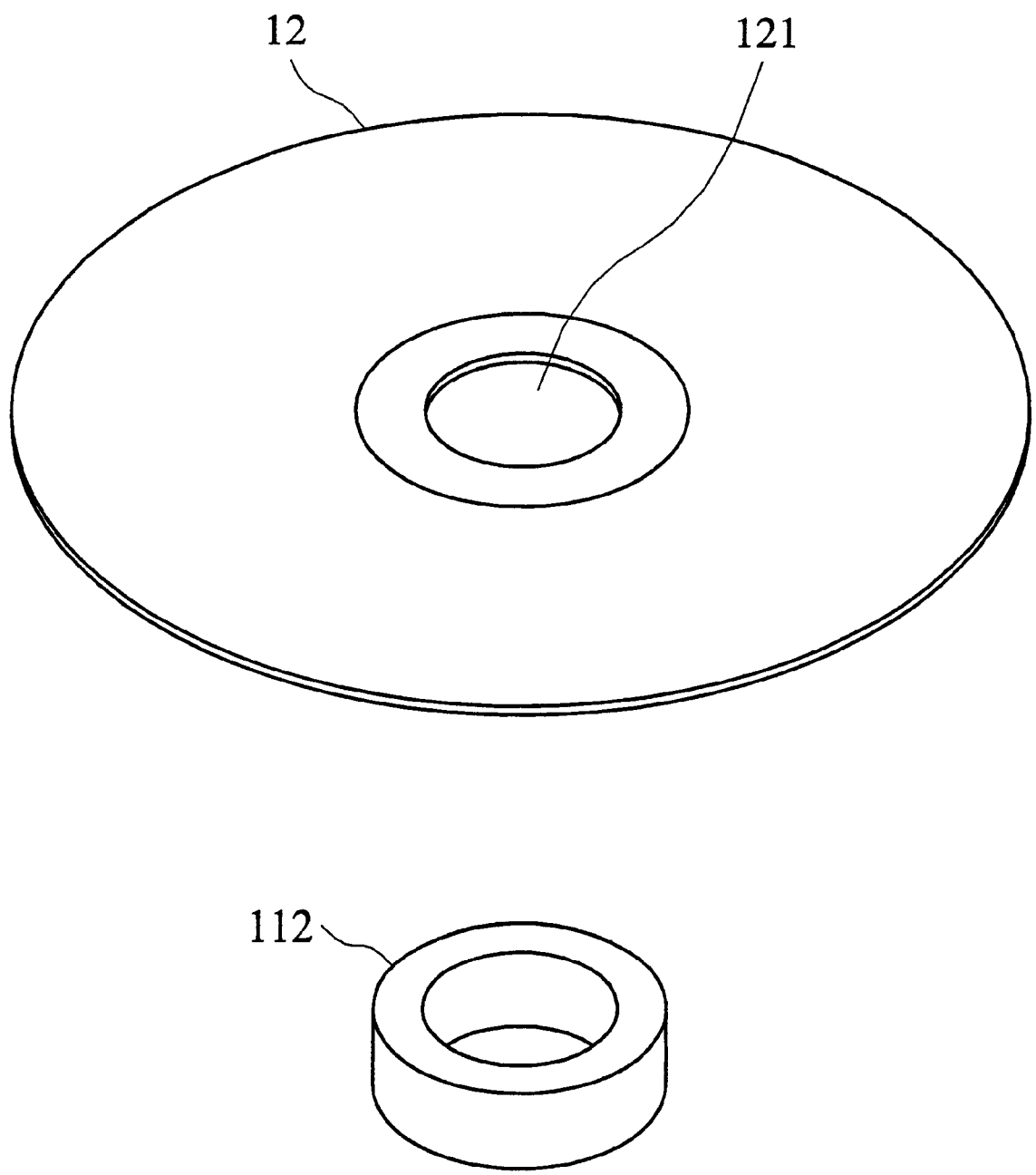
FIG. 2C is schematic view illustrating the magnetic spacer 112 larger than the central opening 121 of the CD 12 in diameter according to the first embodiment of the invention.

Referring to FIG. 2A, a transportation mechanism 11 according to the first embodiment of the invention includes a reciprocating device 113 having a base 114, an electromagnetic head 111 having an electromagnet and being provided on the base 114, a control unit 115 controlling the reciprocating device 113 and the electromagnetic head 111, and a magnetic spacer 112 having a central opening larger than that of the CD in diameter, as shown in FIG. 2C.

Figure 3:
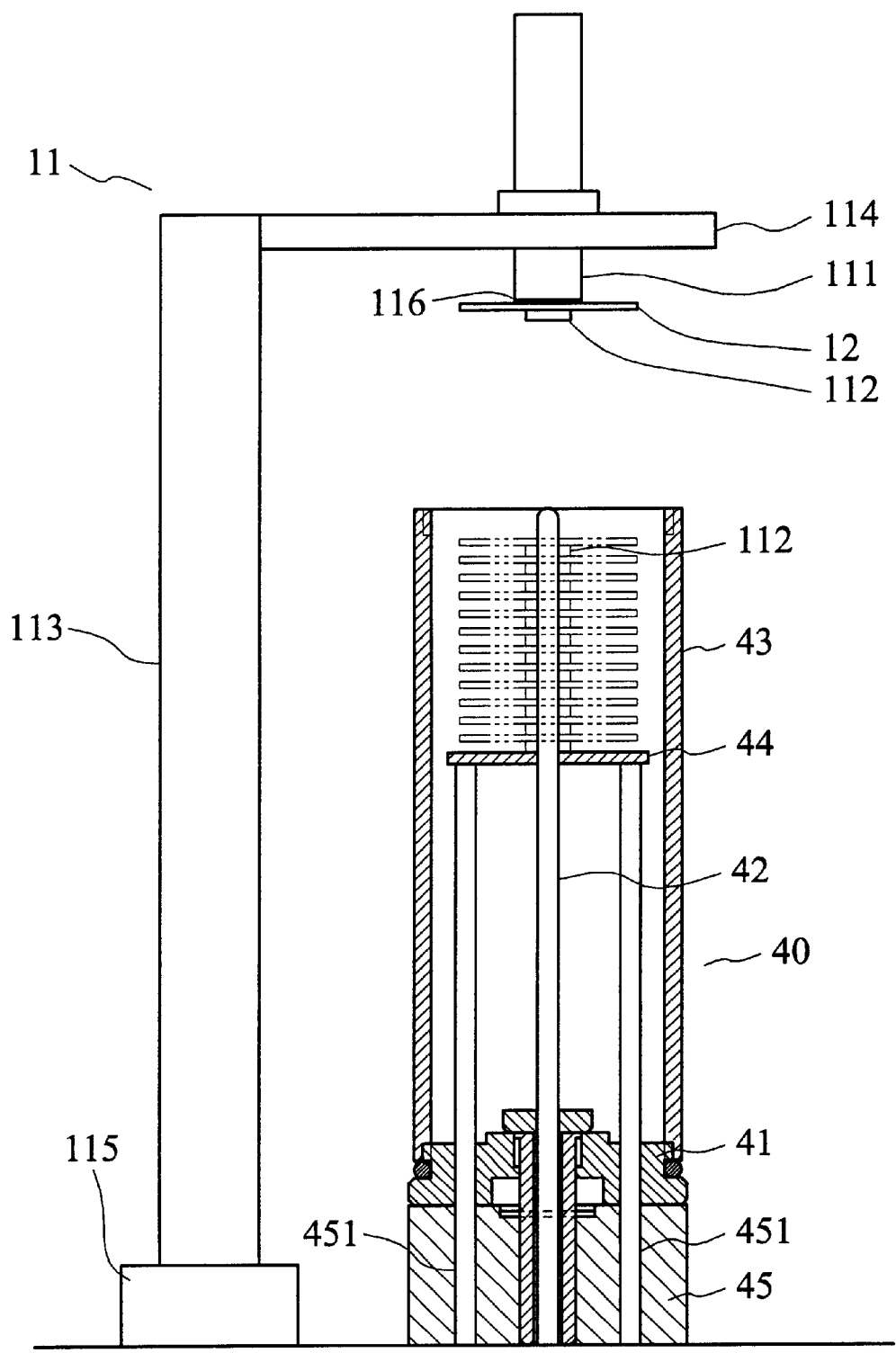
FIG. 3 is a schematic view of the first embodiment of the invention in coordination with a disk magazine.

Referring to FIG. 3, CDs are normally stored in a disk magazine 40 for further accessing. The disk magazine 40 includes at least a bottom stage 41, a vertical shaft 42 being fixed at the center of the bottom stage 41 at one end and extending upward, a barrel 43 tightly combined with the bottom stage 41 at the bottom side, a pop-up piece 44 having an opening through which the vertical shaft 42 extends and moving along the vertical shaft 42, and a lifting mechanism 45. The lifting mechanism 45 is provided with a plurality of pushing shafts 451 passing through the bottom stage 41 and pushing up or laying down the pop-up piece 44. The magnetic spacer 112 between each CD can protects CDs from being scratched by each other and the electromagnetic head 111 attracts a CD and the magnetic spacer 112 below the CD simultaneously.

Figure 4:
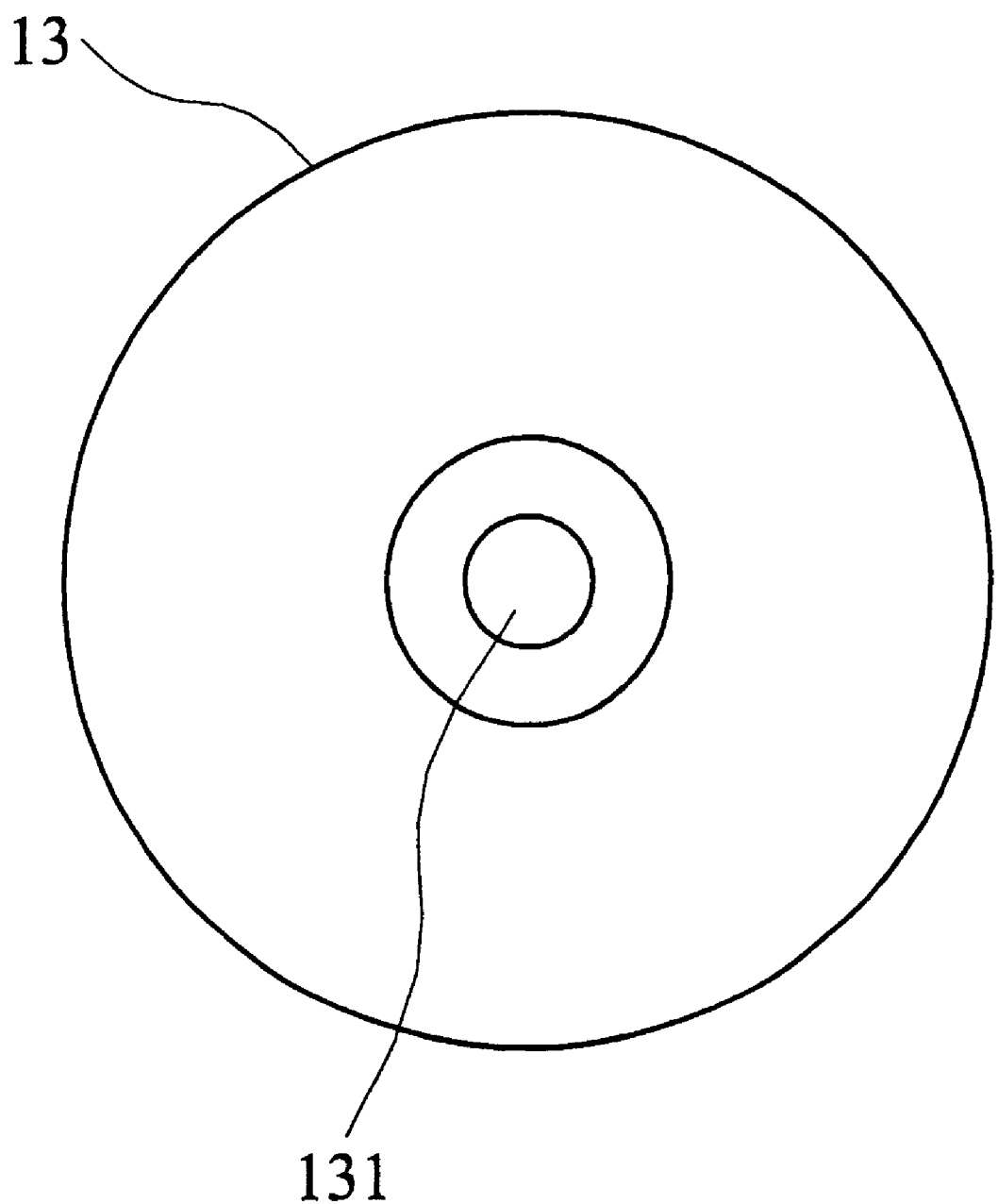
FIG. 4 is a schematic view illustrating a magnetic film on the CD to be processed according to the second embodiment of the invention.

Referring to FIG. 4, to access CDs from the disk magazine 40, the electromagnetic head 111 is moved and attached to the CD 12 by the reciprocating device 113, then the CD 12 is attracted by the electromagnetic head 111 and sandwiched between the electromagnetic head 111 and the magnetic spacer 112 as the electromagnet of the electromagnetic head 111 is powered on, wherein the attachment of the electromagnetic head is on the non-information zone around the opening of the CD 12. Next, the CD 12 is transported by the reciprocation device 113 to a predetermined position and the electromagnetic head 111 is powered off once the CD 12 is positioned.

Referring to FIG. 3, the lifting mechanism 45 can control the movement of the pop-up piece 44 in accordance with the position of the topmost CD in the disk magazine 40 as to keep the topmost CD at a specified position along the vertical shaft 42. The electromagnetic head 111 is further coated with a polymer resin layer 116 to prevent the CD from being scratched by the electromagnetic head 111.

According to the first embodiment of the invention mentioned above, a transporting method in an electromagnetic way for the manufacturing of compact disks includes the following steps of:

Positioning the CD 12 in alignment with a magnetic spacer 112 below the CD 12;

Moving the electromagnetic head 111 to contact the CD 12 onto the non-information zone of the CD 12;

Switching on the electromagnetic head 111 to attract the CD 12 sandwiched between the electromagnetic head 111 and the magnetic spacer 112;

Transporting the CD 12 attracted by the electromagnetic head 111 to the predetermined position for further processing; and Switching off the electromagnetic head 111 to release the attracted CD 12.

Similar to the first embodiment, a transportation mechanism (not shown) according to the second embodiment of the invention also includes a reciprocating device 113 having a base 114, an electromagnetic head 111 provided on the base 114, and a control unit 115 controlling the reciprocating device 113 and the electromagnetic head 111. The difference between the first and second embodiments is that the latter is free from use of the magnetic spacer 112 by coating a magnetic film onto the non-information zone 132 around the opening 131 of the CD 13 as shown in FIG. 4 such that the CD 13 is directly attracted by the electromagnetic head 111 onto the non-information zone 132. Therefore, the second embodiment is further advantaged for simplifying the transporting process in the manufacturing of compact disks.

According to the second embodiment of the invention mentioned above, a transporting method in an electromagnetic way for the manufacturing of compact disks includes the following steps of:

Moving the electromagnetic head 111 to contact the CD 13 onto the non-information zone 132 coated with a magnetic film;

Switching on the electromagnetic head 111 to attract the CD 13;

Transporting the CD 13 attracted by the electromagnetic head 111 to the predetermined position for further processing; and Switching off the electromagnetic head 111 to release the attracted CD 13.

While this invention has been described with reference to specific embodiments, the description illustrative of the invention is not to be construed as limiting the invention. Various modifications to the present invention can be made to the preferred embodiments by those skilled in the art without departing from the true spirit and scope of the invention as defined by the appended claims.

What is claimed is:

1. A transportation mechanism of magnetic handling for accessing CDs (Compact Disks), comprising:
    a reciprocating device having a base;
    an electromagnetic head being provided on said base and having an electromagnet;
    a control unit controlling the reciprocating device and said base to move between different processing positions; and
    a magnetic spacer positioned below a CD;
        wherein the CD is sandwiched between said electromagnetic head and said magnetic spacer as said magnetic spacer is attracted by said electromagnetic head and the CD is further transported between different processing positions.

2. A transportation mechanism as claimed in claim 1, wherein said magnetic spacer is larger than the opening of the CD in diameter.

3. A transportation mechanism as claimed in claim 1, wherein said electromagnetic head is further coated with a polymer resin layer to prevent the CD from being scratched by said electromagnetic head.

4. A transportation mechanism of magnetic handling for accessing CDs (Compact Disks), comprising:
    a reciprocating device having a base;
    an electromagnetic head being provided on said base and having an electromagnet;
    a control unit controlling said reciprocating device and said base to move between different processing positions; and
    a magnetic film coated on the non-information zone around the opening of a CD;
        wherein the CD is transported between different processing positions as the magnetic film of the CD is attracted by said electromagnetic head.

5. A transportation mechanism as claimed in claim 4, wherein said electromagnetic head is further coated with a polymer resin layer to prevent the CD from being scratched by said electromagnetic head.

6. A transporting method of magnetic handling for accessing CDs (Compact Disks), comprising the steps of:
    positioning a CD in alignment with a magnetic spacer below the CD;
    moving an electromagnetic head having an electromagnet to contact the CD onto the non-information zone of the CD;
    switching on the electromagnet of said electromagnetic head to attract the magnetic spacer and the CD sandwiched between said electromagnetic head and said magnetic spacer;
    transporting the CD to a predetermined position for further processing; and
    switching off the electromagnet of said electromagnetic head to release the CD.

7. A transporting method of magnetic handling for accessing CDs (Compact Disks), comprising the steps of:
    moving an electromagnetic head having an electromagnet to contact a magnetic film coated on a non-information zone of a CD;
    switching on said electromagnet of the electromagnetic head to attract the magnetic film of the CD;
    transporting the CD to a predetermined position for further processing; and
    switching off the electromagnet of said electromagnetic head to release the CD.

* * * * *